(12) United States Patent
Fisher (10) Patent No.: US 9,156,309 B2
(45) Date of Patent: Oct. 13, 2015

(54) SYSTEM AND METHOD FOR PRODUCING MADE-TO-ORDER DESIGNS ON THE SURFACE OF AN EXTRATERRESTRIAL BODY

(71) Applicant: LIFT-OFF TECHNOLOGIES CORPORATION, Huntingdon Valley, PA (US)

(72) Inventor: Gary Fisher, Huntingdon Valley, PA (US)

(73) Assignee: LIFT-OFF TECHNOLOGIES CORPORATION, Huntingdon Valley, PA (US)

( * ) Notice: Subject to any disclaimer, the term of this patent is extended or adjusted under 35 U.S.C. 154(b) by 0 days.

(21) Appl. No.: 14/461,569

(22) Filed: Aug. 18, 2014

(65) Prior Publication Data

US 2014/0373988 A1 Dec. 25, 2014

Related U.S. Application Data

(62) Division of application No. 14/065,808, filed on Oct. 29, 2013, now Pat. No. 8,843,247, which is a division of application No. 13/239,867, filed on Sep. 22, 2011, now Pat. No. 8,600,580.

(60) Provisional application No. 61/385,184, filed on Sep. 22, 2010.

(51) Int. Cl.
| | |
|---|---|
| *B60B 9/06* | (2006.01) |
| *B64G 1/16* | (2006.01) |
| *B60B 19/04* | (2006.01) |
| *G05D 1/02* | (2006.01) |
| *G06F 17/00* | (2006.01) |
| *G05D 1/00* | (2006.01) |
| *G06Q 99/00* | (2006.01) |

(Continued)

(52) U.S. Cl.
CPC .............. *B60B 9/06* (2013.01); *B60B 19/04* (2013.01); *B64G 1/16* (2013.01); *B64G 1/66* (2013.01); *B64G 4/00* (2013.01); *G05D 1/0011* (2013.01); *G05D 1/02* (2013.01); *G06F 17/00* (2013.01); *G06Q 99/00* (2013.01)

(58) Field of Classification Search
CPC ............ B60B 9/06; B60B 19/04; B64G 1/66; B64G 4/00; B64G 1/16; G06Q 99/00; G05D 1/0011; G05D 1/02; G06F 17/00
USPC .......................................................... 701/22
See application file for complete search history.

(56) References Cited

U.S. PATENT DOCUMENTS

| | | | | | |
|---|---|---|---|---|---|
| 2,417,382 | A | * | 3/1947 | Spira ............................... | 152/15 |
| 2,916,331 | A | * | 12/1959 | Gardner .......................... | 305/19 |

(Continued)

*Primary Examiner* — Mary Cheung
*Assistant Examiner* — Anne Mazzara
(74) *Attorney, Agent, or Firm* — Saul Ewing LLP (57) ABSTRACT

A method for producing designs involves receiving a request to create a design on the surface of an extraterrestrial body, transmitting a control signal to a device on a vehicle on the extraterrestrial body, the control signal causing the device to create the design, and receiving an image signal providing an image of the design created on the surface. A device for producing the designs includes a surface altering tool configured to rearrange material on the surface. The tool may be provided as a configurable-tread rover wheel that includes a wheel hub having radially-extending channels, and tread elements supported in the channels that are selectively articulatable under the control of a control module to form a tread pattern corresponding to a design intended to be produced. The tread elements may be selectively extended or retracted by operation of an array of solenoids controlled by the control module.

6 Claims, 9 Drawing Sheets

(51) Int. Cl.
  *B64G 1/66* (2006.01)
  *B64G 4/00* (2006.01)

(56) References Cited

U.S. PATENT DOCUMENTS

| | | |
|---|---|---|
| 5,151,277 A | 9/1992 | Bernardon et al. |
| 5,330,343 A | 7/1994 | Berteau |
| 6,239,767 B1 | 5/2001 | Rossi et al. |
| 6,776,619 B1 | 8/2004 | Roberts et al. |
| 7,174,935 B2 * | 2/2007 | Kahen .................. 152/216 |
| 7,418,236 B2 | 8/2008 | Levin et al. |
| 7,988,096 B2 | 8/2011 | Humphries |
| 2002/0154174 A1 | 10/2002 | Redlich et al. |
| 2007/0063104 A1 | 3/2007 | Humphries |
| 2007/0072546 A1 | 3/2007 | Jenkin et al. |
| 2010/0162137 A1 | 6/2010 | Ganz et al. |
| 2010/0312428 A1 | 12/2010 | Roberge et al. |
| 2012/0227884 A1 * | 9/2012 | Kahen et al. ............ 152/216 |

* cited by examiner

Figure 10

SYSTEM AND METHOD FOR PRODUCING MADE-TO-ORDER DESIGNS ON THE SURFACE OF AN EXTRATERRESTRIAL BODY

CROSS-REFERENCE TO RELATED APPLICATION

This application is a division of U.S. application Ser. No. 14/065,808, filed Oct. 29, 2013, which is a division of U.S. application Ser. No. 13/239,867, filed Sep. 22, 2011, which claims the benefit of priority under 35 U.S.C. §119(e) of U.S. Provisional Patent Application No. 61/385,184, filed Sep. 22, 2010, the entire contents of which are hereby incorporated herein by reference.

FIELD OF THE INVENTION

The invention pertains to the surface alteration of extraterrestrial bodies.

BACKGROUND OF THE INVENTION

People are always looking for a unique way to commemorate some event, for example, birthday, bar mitzvah, graduation, wedding, anniversary, death, athletic victory, etc.; or send a greeting or gift to others at a holiday such as Valentines day or Christmas.

Even before the landing of Apollo XI in 1969, which returned images from that expedition of the first boot prints of humans on the surface of the Moon, human beings have dreamed about leaving their own mark on other worlds. While the actual rate of deterioration of these foot prints and wheel tracks left in the lunar soil will remain unknown until humans or their robotic explorers can return to study them, the general scientific consensus is that these marks will remain discernible for possibly many millennia. They may be longer lasting evidence of human civilization than the pyramids of ancient Egypt.

Advances in astronautics and aerospace engineering over the past 50 years have made it possible to offer equipment which will permit people to reach out and touch, figuratively speaking, surfaces of other bodies in our solar system. Twin, telerobotically operated, Soviet Lunokhod moon rovers of the early 1970s collectively traveled almost 47 km during a combined 15 months of operation; and also by the success of the American Mars Exploration Rovers, Spirit and Opportunity, which operated for over 5 years on the surface of Mars collectively traveling over 21 kilometers by the end of 2008 using a combined telerobotic and autonomous mode of operation.

SUMMARY OF THE INVENTION

This opens the door to offering a service to people on Earth that would permit them to place an incredibly long-lasting design, message, image, etc. on the surface of the Moon, an asteroid, or some other extraterrestrial body by means of a proxy manipulator that rearranges the surface material. This invention presents a method for offering and delivering such a service and the related Earth-based products that can be produced and delivered based upon such a service.

Not all extraterrestrial bodies are suitable for creating long-lived designs on their surfaces. The absence of such things as an atmosphere, significant seismic activity, thermal cycling, volcanic activity, ongoing extensive asteroid bombardment, flowing liquids, etc. are some of the factors needed for the surface of an extraterrestrial body to remain unaltered for extremely long periods of time.

The Moon is an example of one body in the solar system that is very suitable for making long-lived designs in the surface material. A design, once made in the lunar surface, has a very low probability of being altered by natural, human, or robotic activity.

This ability to land spacecraft on another planet and move them about the surface opens up the possibility of sending such a spacecraft outfitted with a means of altering the surface material in order to implement designs based upon instructions relayed from people on Earth.

The present invention relates to using a device on the surface of an extraterrestrial body outfitted with a means for altering the surface of the extraterrestrial body so as to implement a desired design on the surface in accordance with an entity's instructions; and to the use of data collected and transmitted back to Earth about the created design to produce images and reproductions of the implemented design to be delivered per the entity's instructions.

One embodiment of the present invention provides a method for producing made-to-order designs on a surface of an extraterrestrial body. The method comprises receiving from an entity a request to create a design on the surface of the extraterrestrial body; transmitting a control signal to a device on a vehicle on the extraterrestrial body, the control signal causing the device to create the design; and receiving an image signal sent from the vehicle, the image signal providing an image of the design created on the surface.

Another embodiment of the present invention provides a device for producing made-to-order designs on a surface of an extraterrestrial body. The device comprises a surface altering tool configured to rearrange material on the surface; a motorized vehicle capable of traversing the surface of the extraterrestrial body, the vehicle supporting the surface altering tool; an imaging device supported on the vehicle, the imaging device being configured for capturing an image of the surface; a communication system for receiving a control signal transmitted from Earth, and for transmitting an image signal to Earth; and a control module configured to control operation at least one of the vehicle and the surface altering tool to produce a design in accordance with the control signal.

In a certain embodiment, the surface altering tool comprises a configurable-tread rover wheel. The configurable-tread rover wheel comprises a wheel hub comprising a plurality of radially-extending channels; a plurality of tread elements, each tread element being supported in a respective one of said plurality of radially-extending channels, each tread element comprising: a tread head supported on an elongated post; a rotating cup having a central opening for receiving said post, a radially-extending flange and a plurality of longitudinally-extending ridges spaced about its periphery, said rotating cup terminating in a pin; a spring supported about said post and abutting said flange to bias said tread head toward a retracted position; an elongated push pin having a central opening for receiving said pin of said rotating cup; a grooved insert having an internal channel admitting passage of said elongated push pin and a plurality of longitudinally-extending grooves spaced about its channel, the grooved insert further comprising a plurality of angled surfaces configured to guide the ridges of the rotating cup and cause incremental rotation of the rotating cup about an axis in response to reciprocation of the rotating cup within the grooved insert along the axis; and a plurality of solenoids supported within said wheel hub, each of said plurality of solenoids being operatively connected to said control module to permit actuation of each said solenoid upon receipt of a control signal from said control module.

Also provided is a system for producing made-to-order designs on a surface of an extraterrestrial body. The system comprises a communication system for transmitting a control signal to a device on the extraterrestrial body; and a computer-implemented system comprising: a request module for receiving a request to create a design on the surface of the extraterrestrial body; a command module for preparing the control signal causing the device to create the design; and an imaging module for receiving from the device an image signal providing an image of the design created on the surface.

BRIEF DESCRIPTION OF THE DRAWINGS

The present invention will now be described by way of example with the reference to the following drawing in which.

DETAILED DESCRIPTION

Generally, the present invention involves providing a device on the surface of an extraterrestrial body, such as the Earth's moon. The present invention further involves receiving on Earth a request to create a design on the body, causing the device to create the design and to send an image of (or data representing) the created design back to Earth, and then delivering the image, or a product incorporating the image, to a recipient on Earth.

Figure 1:
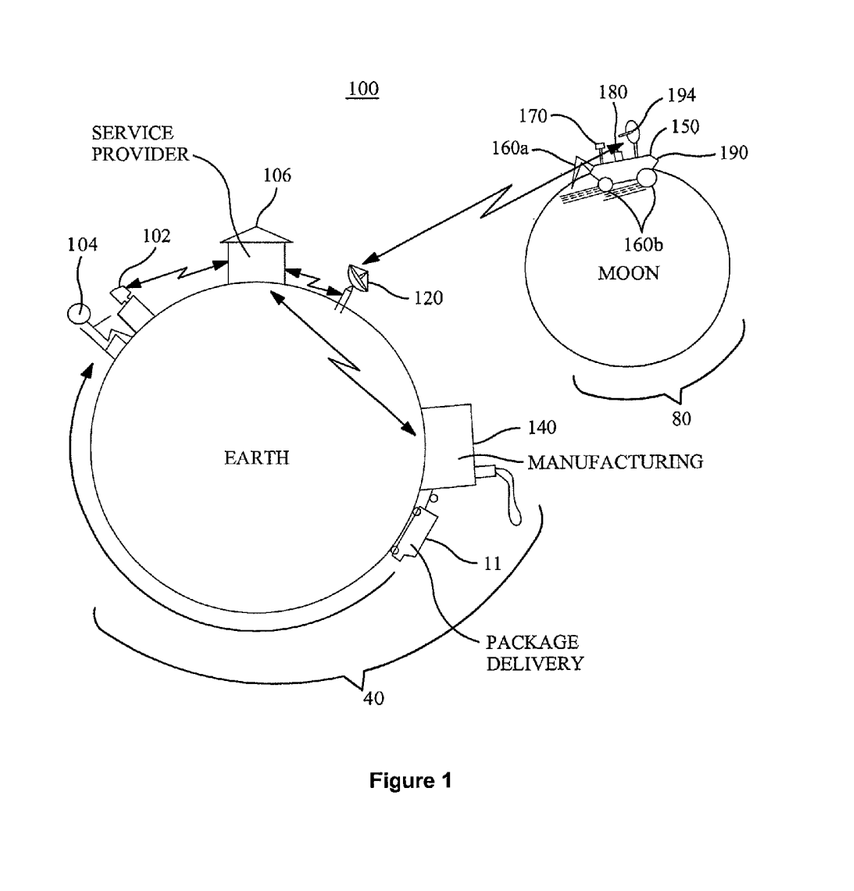
FIG. 1 is a diagrammatic view of a system for producing made-to-order designs on the surface of an extraterrestrial body in accordance with an exemplary embodiment of the present invention.
Figure 2:
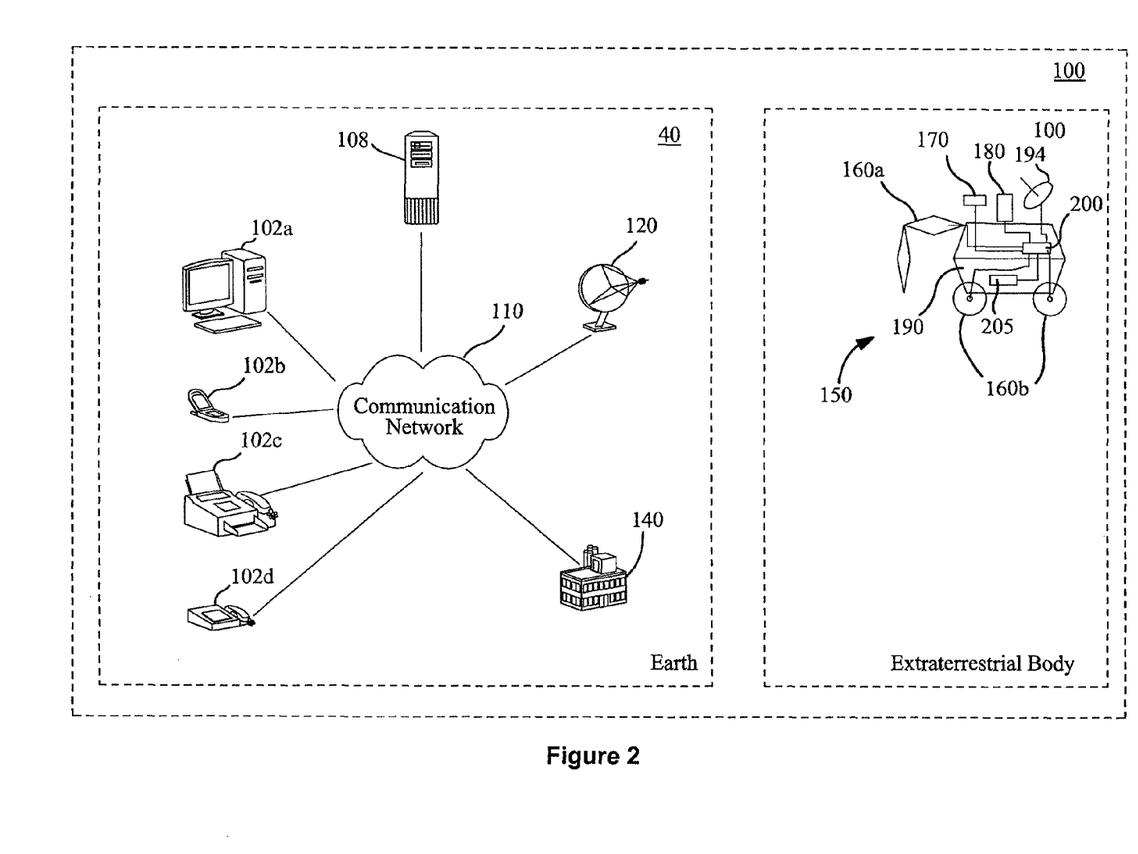
FIG. 2 is a schematic view of the system of FIG. 1.

Referring now to FIGS. 1 and 2, an exemplary system 100 for producing made-to-order designs on the surface of an extraterrestrial body includes an Earth-bound portion 40 and an extraterrestrial portion 80. The Earth-bound portion 40 includes input devices 102 by which an entity 104, such as an individual, organization, business, or group of people, may interact with the system to enter a request for creation of a specific design. Examples of such input devices include a personal computer 102a (e.g., via e-mail or a web site), a mobile telephone/smartphone 102b, a fax machine 102c, or a telephone 102d. Requests may also be received via mail or courier and be entered by a system operator.

The input devices 102 are used to provide the request to a service provider 106. More specifically, the input devices are operatively connected for communication with the service provider 106's computerized system 108 via a communications network 110, such as the Internet. The computer-implemented system 108 may include conventional hardware and software, and further includes in accordance with the present invention at least a request module for receiving a request to create a design on the surface of the extraterrestrial body, a command module for preparing the control signal causing the device to create the design, and an imaging module for receiving from the device an image signal providing an image of the design created on the surface.

By way of example, the input device 102 and the system 108 may communicate in a client/server relationship. The service provider's system 108 may process the request to perform one or more of the following functions: to identify the desired design, prioritize the request as a function of a specified desired delivery date, integrate and sequence the request with existing requests, and prepare and send a control signal to the extraterrestrial portion 80 via a communication station 120.

The communication station 120 may include an antenna for radio communication or a telescope-laser system for laser communication. In some cases direct communication between the communication station 120 and the device 150 on the extraterrestrial body may not be possible—such as when the device 150 is on the far side of the body. Optionally, the system 100 includes one or more relay satellites (not shown) in Earth orbit, and/or in orbit around the extraterrestrial body to facilitate communication in such cases.

The transmitted control signal is received by a device 150 deployed on the extraterrestrial body in an extraterrestrial portion 80 of the system. The device includes a surface altering tool 160a, 160b carried about by a transport vehicle 190. In one embodiment, the transport vehicle 190 is a motorized "rover" capable of traversing the body's surface. The rover may be operated autonomously, telerobotically as controlled from a remote location, by an on-board operator, or by a combination of the above. Technology for developing and controlling a suitable transport vehicle, and providing it on the surface of an extraterrestrial body, are well-known in the art and thus are not discussed in detail herein.

The surface altering tool 160a, 160b is configured to physically alter the surface of the extraterrestrial body so as to impart a desired design (see design 6, FIG. 1), and may have any suitable form. By way of example, the surface altering tool may include components for rearranging the body's surface material by: mechanical means, such as, brushing, blowing, excavating, drilling, stamping, molding, extruding, sorting, raking, or sifting; altering the composition of the surface material by the application of energy, such as, heat, radio frequency energy, or light; applying a coating material; mixing the surface material with material brought or collected from another place or places; applying a magnetic field; or using explosives.

In one embodiment, a robotic arm 160a, either with appropriate end effector(s), or wielding the appropriate tool(s), provides the desired surface altering using any of the techniques and/or tools described previously. In embodiments in which the desired surface altering consists of symbols for which the robotic arm's motions can be preprogrammed and stored locally on the device 150, the amount of communication traffic between the Earth and the extraterrestrial body can be significantly reduced. Robotic arms capable of various sorts of fine and gross altering have been built for use on Earth in industry, and various arms have been included on rovers sent into space. For example the Mars Exploration Rovers each have a robotic arm with a rotating rock abrasion tool on the end. An exemplary simplified embodiment uses a robotic arm with a single stylus on the end that can be dragged through the surface material to create designs, similar to what a human being might do with their index finger to "write" in the sand on a beach. Accordingly, technology for developing and controlling a suitable arm are well-known in the art and thus are not discussed in detail herein.

In another embodiment, the surface altering tool 160b is provided as a wheel of the transport vehicle that has a tread structure configurable so as to impress into the surface a design, for example, text, as the rover traverses the surface. In one such embodiment, individual elements (e.g., tread blocks) of the tread are articulatable, e.g. radially with respect to the wheel or otherwise, such that the tread as a whole is configurable on-the-fly to change in accordance with the requested design. For example, individual tread blocks may be automatedly (under the control of a control module 200, discussed below) radially extended or retracted to provide an overall tread design that will leave an impression in surface material of the extraterrestrial body that will provide a visually perceptible version of the desired design—e.g., the text "YOUR NAME" This configurable-tread wheel embodiment is advantageous in that it would little interfere with other missions of the rover and also incorporates a useful capability for adjusting the traction of the wheels for different surface conditions. The configurable tread is particularly well-suited for creating designs composed of a few arrayed elements such as block text characters. A wheel capable of configuring its tread can be based upon any number of enabling technologies. For example, the Braille Wheel described in U.S. Pat. No. 6,776,619, the entire disclosure of which is hereby incorporated herein by reference, could form the basis for one such wheel with a configurable tread pattern.

Figures 5, 7:
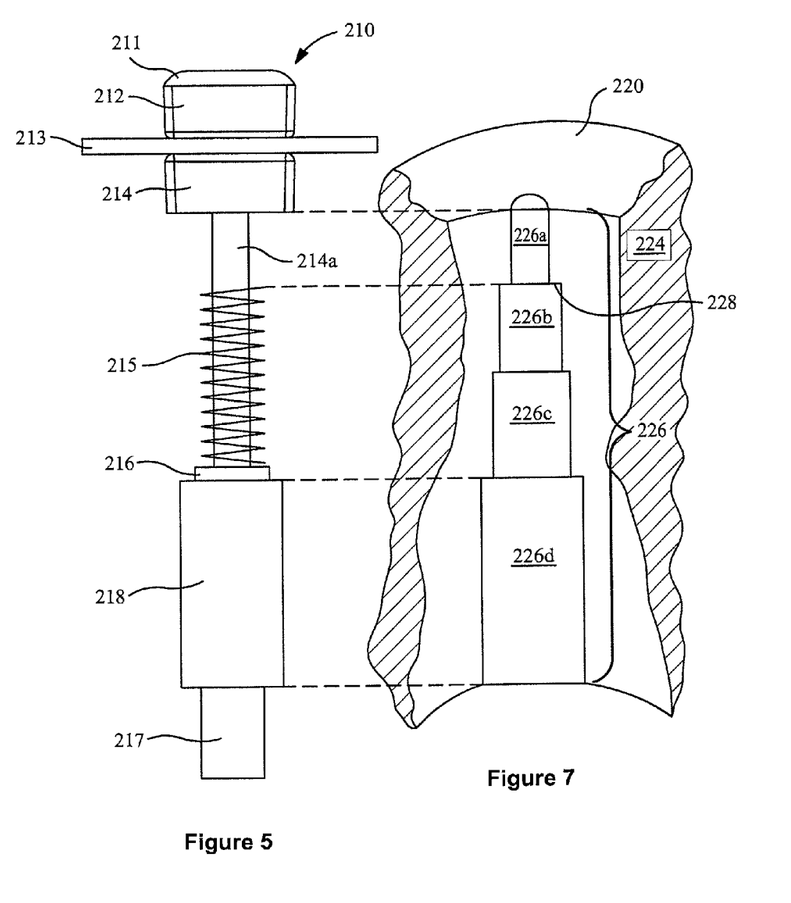
FIG. 5 is the exemplary tread head of FIG. 4, shown assembled to create a tread head.
FIG. 7 is a partial cross-sectional view of the wheel hub of FIG. 6, showing an exemplary channel into which a respective tread head is inserted during assembly.
Figure 6:
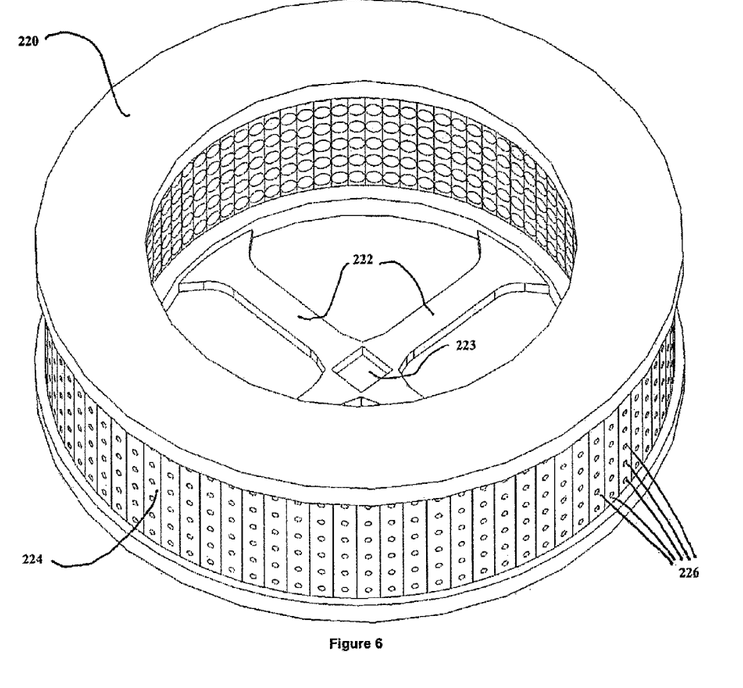
FIG. 6 is a perspective view of an exemplary wheel hub of a configurable-tread rover wheel in accordance with the present invention.
Figure 8:
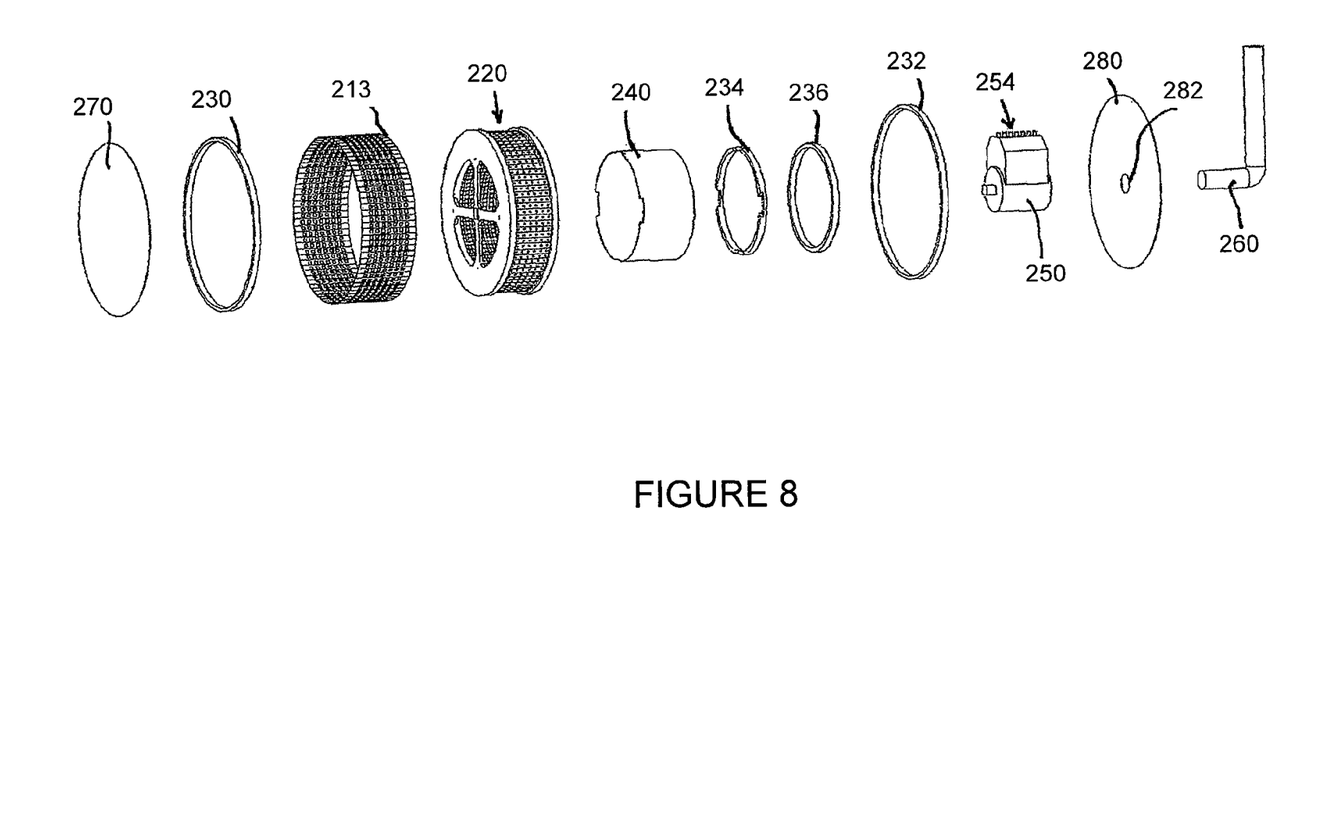
FIG. 8 is an exploded view of an exemplary configurable-tread rover wheel, shown without the tread heads for illustrative clarity.
Figure 9:
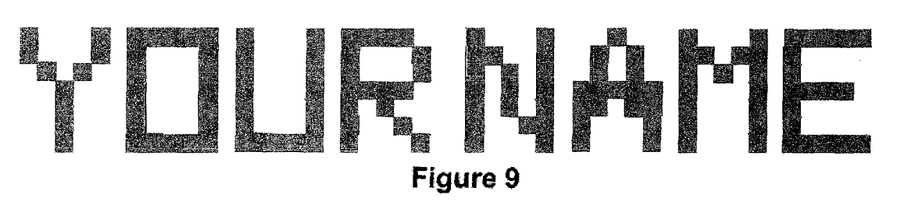
FIG. 9 is an image of an exemplary textual message created with a configurable-tread rover wheel in accordance with the present invention.

An exemplary embodiment of a configurable-tread rover wheel 160b consistent with the present invention is described below with reference to FIGS. 4-8. Each configurable-tread wheel 160b includes a plurality of components, including a plurality of selectively articulatable tread elements 210 supported on a wheel hub 220, as shown in FIGS. 6 and 8. The wheel hub 220 includes spokes 222 for supporting the hub 220 on an axle or other rotational-drive mechanism. The wheel hub 220 further includes a circumferential support 224 defining a plurality of radially-extending channels 226. Though any suitable arrangement may be used, in one embodiment, the channels 226 are arranged in a regular array extending both circumferentially and axially, as best shown in FIG. 6. In the exemplary embodiment shown, the wheel hub 220 includes 7 parallel rows of axially-spaced channels 226. In each row, the channels are spaced at angular intervals (e.g., every 4.2857 degrees for an embodiment including 84 circumferentially-spaced channels) about the wheel hub 220.

Figure 4:
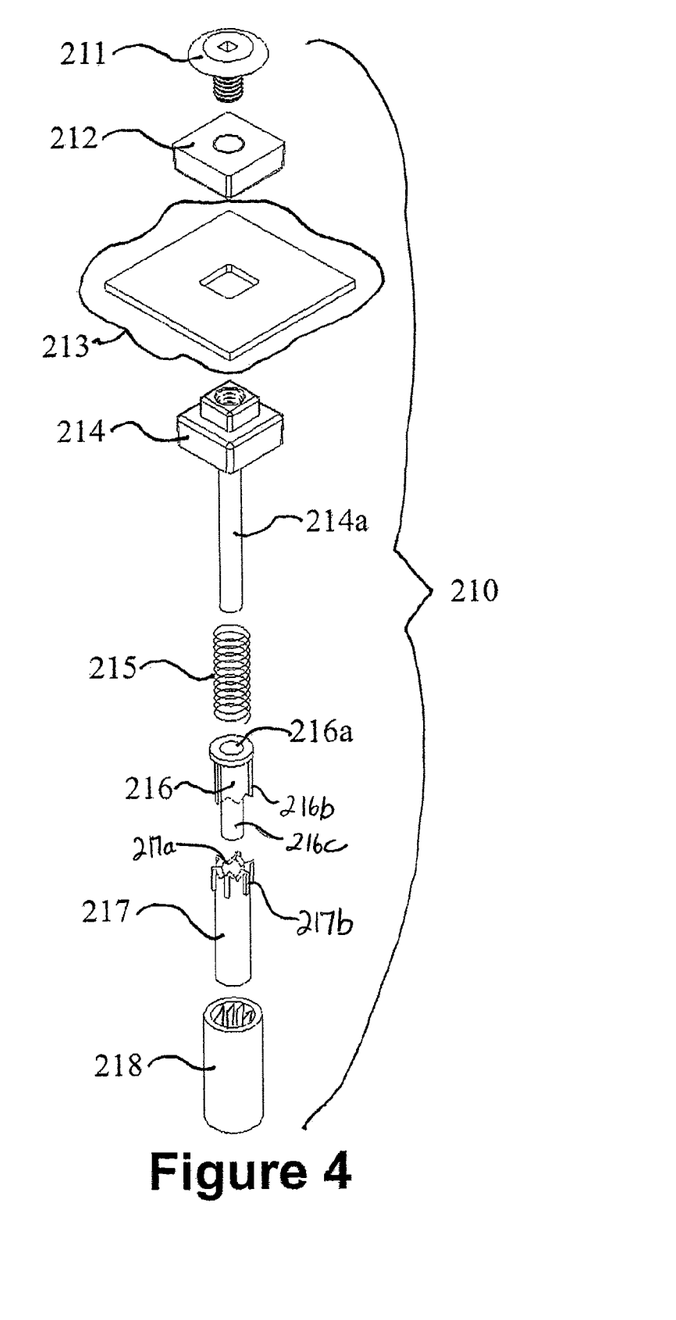
FIG. 4 is an exploded view of an exemplary embodiment of a tread head of a configurable-tread rover wheel compatible with the rover shown in FIG. 3.

FIG. 4 shows subcomponents of the tread element 210 in an exploded view. FIG. 5 is the exemplary tread element 210 of FIG. 4, shown assembled. Referring now to FIGS. 4 and 5, the tread element 210 includes a top tread head 212 connected to a lower tread head 214 by a bolt 211 passing through the top tread head 212. These head elements are arranged such that an elastic membrane 213 (see FIG. 8) is captured therebetween. As described in greater detail below, the membrane 213 prevents dust and dirt from migrating between and underneath the tread heads and interfering with their normal operation.

The lower tread head 214 includes an elongated post 214a about which are positioned a coil spring 215, a rotating cup 216, a push pin 217, and a grooved insert 218. These elements are shown assembled into a single tread element 210 in FIG. 5.

FIG. 7 is a partial cross-sectional view of the wheel hub 220 of FIG. 6, showing an exemplary channel 226 in which a respective tread element 210 is supported in an assembled configurable-tread wheel 160b. The exemplary channel 226 has a stepped configuration defined by multiple sections of co-axial openings. The arrangement and dimensions of the sections of the channel 226 correspond to the components of the tread element, as will be appreciated by the juxtaposition of FIGS. 5 and 7.

Using a wheel hub 220 including 7 parallel rows of channels 226, for example, a single character, e.g. an alphanumeric character, may be composed of an array tread heads that is 7 tread heads high and up to 5 tread heads wide, which is believed sufficient to produce legible capital letters, numbers, and punctuation characters in English. A column of tread heads 7 high by 1 column wide provides adequate spacing between characters.

During assembly of the configurable-tread wheel 160b, the tread elements 210 are inserted into the channels 226 of the wheel hub 220, with the tread head portion (211, 212, and 214) positioned toward an outer periphery of the wheel hub 220, and the push pin 217 positioned toward an inner, central portion of the wheel hub 220. More specifically, the lower tread head 214 is first inserted in a channel 226 from the outermost portion of the wheel hub 220. The spring 215 is then inserted into the channel 226 from the inner, central portion of the wheel hub 220, and is positioned to fit over the protruding post 214a on the lower tread head 214. The first segment 226a of the channel 226 has a diameter only slightly larger than that of the protruding post 214a. The spring 215 is sized so that it is smaller in diameter than the diameter of the second smallest segment 226b of the channel 226, but larger in diameter than the smallest segment 226a. The annular shoulder 228 created in the channel 226 due to differences in the diameters of the adjacent segments 226a, 226b provides a stop for spring 215 and a surface against which the spring 215 can be compressed.

Figure 10:
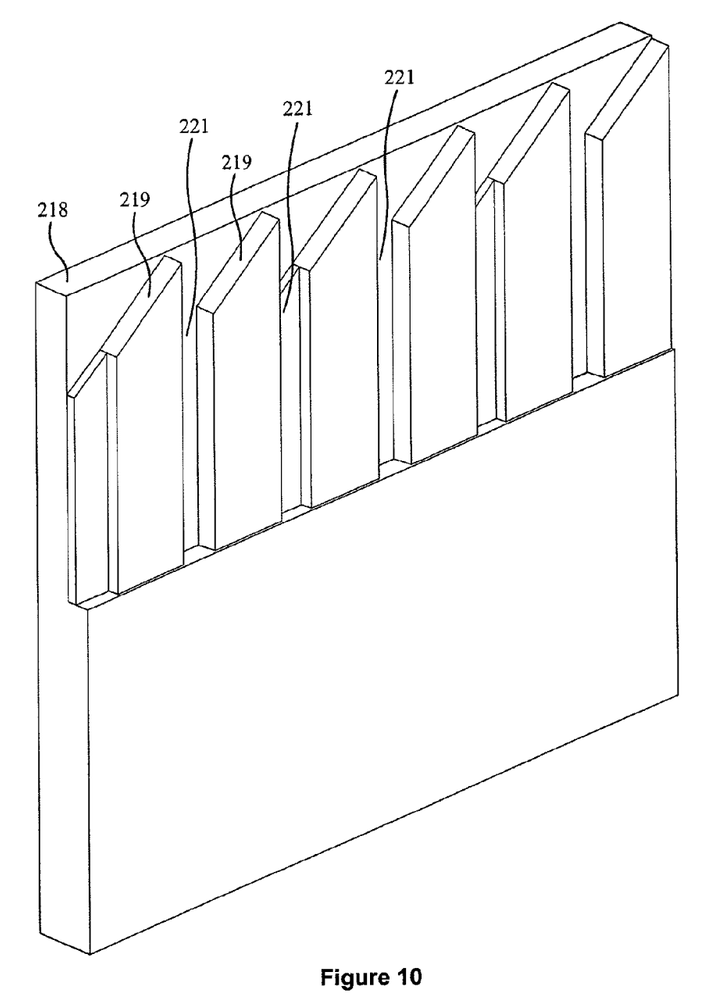
FIG. 10 is a cross-sectional view of the grooved insert of FIG. 4, shown flattened for illustrative clarity.

The rotating cup 216 is inserted next into the channel 226. The rotating cup 216 has an upper flange 216a to push against spring 215. The rotating cup 216 has a bottom pin 216c which fits inside push pin 217. Each push on the bottom of push pin 217 pushes the rotating cup 216 up a distance controlled by the length of the third smallest-diameter segment 226c of the channel 226. This travel length is sufficient to raise the rotating cup 216 enough so that the ridges 216b along a portion of its upper length below the upper flange 216a rise above grooves 221 in the grooved insert 218, as best shown in FIGS. 4 and 10. Referring now to FIG. 10, angled surfaces 219 on the top of the spaces between the grooves 221 of the grooved insert 218 and the bottom of the ridges 216b on the rotating cup 216 cause the ridges 216b to slide down into the next adjacent grooves when the force of spring 215 is no longer overcome by a force being applied to the push pin 217. Since alternating grooves inside the grooved insert 218 alternate in depth (as measured radially from an axis of elongation of the grooved insert 218), the rotating cup 216 is pushed back into the grooved insert 218 in alternating short and long axial depths as the ridges 216b on rotating cup 216 will only fit within the greater depth grooves 221. See FIG. 10. The result is that the tread element's head is alternately positioned between extended and retracted positions as the push pin 217 is successively pushed and released.

Push pin 217 is inserted next into the channel 226. The small diameter bottom pin 216c of the rotating cup 216 fits into a corresponding hole 217a in the top of push pin 217. Push pin 217 has twice the ridges 217b of rotating cup 216 and these are sized to fit into all the grooves 221 of grooved insert 218, both those of greater and lesser depth, so that it can slide along the entire length of the grooves internal to grooved insert 218 as the push pin is pushed.

Grooved insert 218 is inserted last into the channel 226, and is sized to fit within the largest diameter section 226d of channel 226 in an interference/friction fit. However, some form of adhesive or metal joining method may be used to ensure that it stays in place. A portion of the ridge-free section of push pin 217 extends outwardly from the bottom of grooved insert 218.

After all of the tread elements 210 have been inserted into the channels 226 of the wheel hub 220, final assembly of the remaining wheel components may be performed. During such final assembly, the axially-elongated annular membrane 213 (see FIG. 8) is positioned around the wheel hub 220. The membrane 213 is then secured between the tread element's top 212 and bottom 214 heads by tightening the bolts 211 to secure the top heads 212 to respective bottom heads 214. The membrane may be provided with holes for admitting passage of the bolts 211, or the necessary holes may be made during the assembly process. The membrane is further secured to the wheel hub, circumferentially around the inner and outer outside edges of the wheel hub 220, by fastening outer and inner clamping rings 230 and 232. The clamping rings 230, 232 may be attached to the wheel hub 220 by driving a plurality of machine screws or other fasteners through holes in the clamping rings and membrane 213 and into corresponding holes in the wheel hub 220.

To prevent dust and dirt from migrating into spaces around the protruding push pins 217 on the inner, central region of the wheel hub 220, an internal membrane 240 is inserted into the wheel hub 220 and held in place by outer and inner retaining rings 234, 236. In the embodiment shown in FIG. 8, the wheel hub 220 has four spokes on the outer wall of the wheel. To augment the portion of the outer rim used for clamping the internal membrane 240 to the wheel hub, both the membrane 240 and the outer retaining ring 234 may be notched to fit around the spokes. As with the outside clamping rings 230 and 232, the inside clamping rings 234 and 236 may be attached to the wheel hub 220 by a plurality of machine screws or other fasteners that pass through holes in them and also through corresponding holes in the inner membrane 240 and then screw into corresponding holes in the outer and inner inside rims of wheel hub 220. The inner and outer edges of the inner membrane 240 are thus clamped against wheel hub 220 and held in place by these clamping rings 234 and 236. The membrane 240 is held taught by the clamping rings 234 and 236 so that its surface is adjacent the push pins 217.

When assembled into channels 226, the tread elements 210 collectively create a regular array of tread heads, each of which can be articulated individually between an extended positioned, in which the tread's top head 212 is positioned radially outwardly from the rotational axis of the wheel relative to many other top heads, and a retracted position in which the top head 212 is positioned radially inwardly relative to the extended position. Thus, the individual tread elements 210 may be collectively manipulated to create a desired pattern of protruding (or retracted) tread heads that will imprint upon the extraterrestrial body's surface a corresponding design/image as the configurable-tread wheel 160b rotates into contact with the ground and bears a portion of the weight of the vehicle. Generally, pressing radially outwardly on the tip of the push pin 217 will cause the head 212 to move radially outwardly into the extended position and compress spring 215, and spring 215 and/or resilient membrane 213 will cause the head 212 to return to or toward a retracted position.

Each configurable tread wheel 160b further includes a motor 250 supporting a control box 252 containing at least one row of solenoids 254 or other linear actuators spaced such that their plungers align with the push pins 217 of the tread elements 210 in each column of tread heads.

Multiple control boxes 252 with solenoids 254 may be mounted around the periphery of motor 250. To protect the solenoid's 254 plungers from fouling by dust and dirt an elastic cover (not shown) may be attached over the plungers in order to protect the pins and the holes they slides in from fouling by dust and dirt.

Motor 250 is attached to wheel support strut 260, which connects to the vehicle's suspension. Motor 250 has a rotating shaft 251 that fits into a keyed hole 223 at the intersection of the wheel hub's 220 spokes. Fastening of the motor shaft to the wheel hub is by any of the methods known to those skilled in the art. It is through this connection that the rotation of the motor shaft is transferred to the wheel. Thus, wheel 160b/hub 220 rotates relative to the strut 260 while the control boxes 252/solenoids 254 remain fixed relative to the strut 260.

For additional protection against dust, dirt, and rocks, an outer and inner hub cap 270, 280 may be attached to the wheel assembly. The hub caps 270, 280 may be attached by machine screws (now shown) passing through holes in the periphery of the hub caps 270, 280 and being threaded into matching threaded holes (not shown) in the periphery of the wheel hub 220. In order to permit the support strut to connect to the motor, inner hub cap 280 defines a centrally-located opening 282 to admit passage of a portion of the wheel support strut 260. A rotating seal of a form commonly known to those skilled in the art may be used at the hub cap 280/strut 260 interface to permit the hub cap 280 to rotate with the wheel around the support strut 260.

Wires for transmission of electrical power and control signals (if control signals are not sent by wireless transmission) to the motor 250 and the solenoids 254 may be run through the interior of support strut 260. In this manner, it is not necessary to expand the opening 282 in hub cap 280 to permit the wires to run along the support strut and to the vehicles power and control systems. Such a larger opening 282 could permit dust, dirt, and rocks to enter the interior of the wheel hub and potentially foul the tread reconfiguration mechanism.

Control/power signals carried by the wires to the motor and solenoids originate from the control module 200 in accordance with defined logic stored therein. When an appropriate signal is received by a certain solenoid 254, that solenoid is actuated and its movable plunger is caused to impinge upon a push pin 217 of a corresponding tread element 210, and to cause that tread element 210's tread head to be extended (if it was initially retracted) or to be retracted (if it was initially extended), as discussed in greater detail below.

In operation, each solenoid's 242 plungers are rapidly extended and retracted as needed to reset the position of tread heads passing in front of the solenoids 242 as the wheel/hub 220 rotates about the solenoid/box assembly. Each time a solenoid's 242 plunger is extended it would first contact the elastic membrane 240 and push against it, stretching it until the membrane comes in contact with a corresponding tread head push pin 217, which in turn compresses spring 215 of the corresponding tread head 210 and raises rotating cup 216 enough to clear the tops of the grooves in grooved insert 218. When the solenoid's 242 plunger retracts, the spring 215 resiles and pushes the rotating cup 216 back, and the sloped ends of the ridges on the rotating cup and the sloped ends on the spaces between the grooves in grooved insert 218 cause rotating cup 216 to slide back into grooved insert 218 after rotating a partial turn. Just how far into grooved insert 218 rotating cup 216 descends depends upon the depth of the grooves in grooved insert 218 it is pushed into by spring 215. Accordingly, a single push on the push pin 217 may move a tread head to an extended or to a retracted position.

Control software in control module 200 stores the state (extended or retracted) of each tread element 210 on each rover wheel 160b. The control software analyzes a message intended to be imprinted upon the surface of the extraterrestrial body and determines which solenoids need to be actuated, and when, to cause the individual tread elements 210 to collectively form portions of the message that in turn will cause a corresponding impression on the surface of the extraterrestrial body as the rover 150 traverses its surface. For example, the message "YOUR NAME" may be mapped to a grid of tread heads 7 rows high, so that appropriate corresponding solenoids can be extended or retracted as necessary to cause a corresponding tread configuration (having selected extended solenoids mapping out a "YOUR NAME" message) that will form a corresponding impression ("YOUR NAME") on the extraterrestrial body as the rover traverses its surface.

In one embodiment, the transport vehicle's wheels are provided with a set of front wheels that are laterally offset from a set of rear wheels so that a front wheel will not disturb a rear wheel's surface impressions while the vehicle is travelling over the surface in a straight-forward direction (see FIG. 1). This embodiment provides a particularly efficient and productive way to generate multiple lines of impressions in the surface. Examples of designs that might be implemented include, but are not limited to: text; representations of written music; symbols, such as, hieroglyphics, language characters; logos; trademarks; and representations created by molding or shaping the surface material so as to produce an intaglio or bas relief image, such as of a face, hand, or foot print.

The device 150 further includes an imaging device 170 configured for capturing an image of the surface. The imaging device may include one or more still and/or video cameras. Technology for developing and controlling a suitable imaging device are well-known in the art and thus are not discussed in detail herein. The imaging device may optionally capture time and date information. The imaging device may also be used to capture images of other areas of the extraterrestrial body, such as the surrounding terrain as it would appear to someone standing on the extraterrestrial body at the location of the design.

The device 150 further includes a communication system 194 configured to complement and communicate with the communication station 120, such as a radio antenna for radio communication or a telescope-laser system for laser communication. Suitable communication systems are well-known in the art and thus are not discussed in detail herein.

Optionally, the device 150 further includes one or more laser or white light scanners 180. As well-known in the art, such scanners are capable of capturing data relating to a surface. The scanner 180 is used here to capture geometry data representing the design as it exists on the surface, and for creating a corresponding data signal for transmission to Earth. Suitable scanners are well-known in the art and thus are not discussed in detail herein.

Optionally, the device 150 further includes a navigation system 205. The navigation system is configured to produce data identifying a location (e.g., longitude and latitude coordinates) of the design on the extraterrestrial body. Suitable navigation systems are well-known in the art and thus are not discussed in detail herein.

The device 150 further includes a control module 200 configured to control operation of the other components of the device. For example, the control module may provide for computerized control of the vehicle, the surface altering tool (including wheels 160b), imaging system, navigation system, scanning system, and communication system. For example, data from the imaging, laser and navigation devices are transmitted back to the Earth portion of the system 100 via the communication system 190 on the transport vehicle 150.

Signals received from the extraterrestrial portion 80 of the system 100 are received on Earth via the communication station 120. For example, these signals may be communicated to the service provider 106. The service provider, or more specifically its system 108, receives the data relating to the production on the extraterrestrial body of the requested design, formats the data and relays it to one or more manufacturing facilities 140.

Along with such information, the service provider also sends data relating to merchandise that the entity has requested. The request for such merchandise may have been provided by the entity along with the request to produce the design. Examples of merchandise that the entity may request include: a copy of some or all of the raw data (including for example an electronic image file in *.jpg or other format) collected directly transmitted to the entity (e.g., via an e-mail), a copy of some or all of the data collected, either raw or formatted, delivered on data recording media such as a DVD, posting of their design images or video, or other data on a website, images of their design on products such as framed or unframed images, greeting cards, coffee mugs, apparel, and wall paper. Any requested merchandise that cannot be delivered electronically, may be loaded onto a transport vehicle (e.g., vehicle 11, FIG. 1) for delivery of the merchandise to the entity.

An example of merchandise that may be requested is a set of data and images that document the creation of the design on the extraterrestrial body. Such documentation, framed or unframed, may contain one or more of the following non-limiting examples: a panoramic image of the location where the design was implemented, including the design as imported to the location; image(s) of the implemented design; image(s) of the transport vehicle containing the surface altering device that implemented the design; image(s) of the launch of the transport vehicle to the extraterrestrial body; statistics and information regarding the transport vehicle; statistics and information regarding the launch vehicle; date and time stamp of when the design was implemented; geographical coordinates on the extraterrestrial body on which the design was implemented; and/or image(s) and/or text selected and supplied by the entity. Items could be manufactured according to some predefined format, or permit customization based upon input from the requesting individual or entity. An example of the latter would be to permit the individual to select from a choice of frame styles when ordering a framed image of their design imparted on the surface of the extraterrestrial body.

The data collected from the laser or white light scanner(s) 180 along with the image data collected from the imaging device(s) 170 can be used to generate three-dimensional replicas of the implemented design. Conventional rapid prototype machines can make such replicas from a variety of materials at different scales and resolutions. These replicas may be colored to match the actual design on the surface of the extraterrestrial body using the image data collected by the imaging device(s) 170. The service provider 106 may outsource any or all aspects of this process to other entities.

Figure 3:
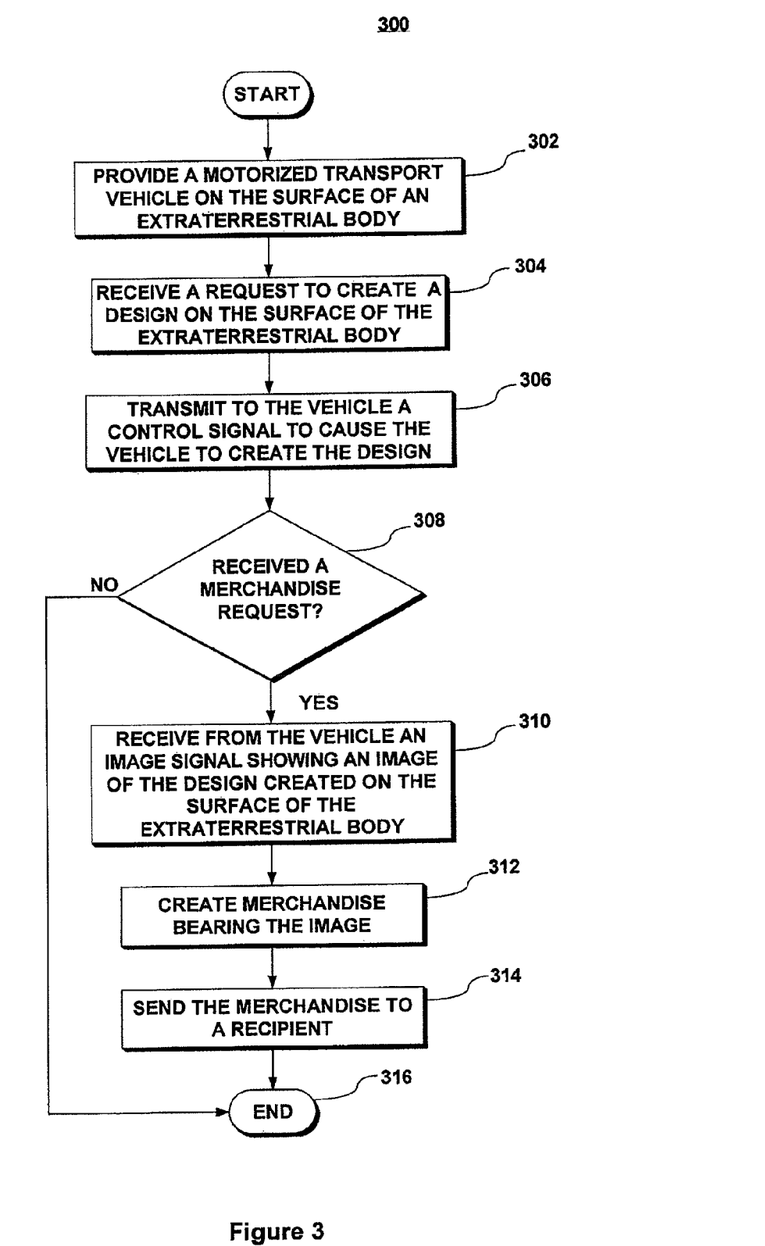
FIG. 3 is a flow diagram depicting a method for producing made-to-order designs on the surface of an extraterrestrial body in accordance with an exemplary embodiment of the present invention.

Referring now to FIG. 3, a flow diagram 300 depicting an exemplary method for producing made-to-order designs on the surface of an extraterrestrial body is shown. As shown in FIG. 3, the method begins with providing a device on the surface of the extraterrestrial body, as shown at step 302. As discussed above, the device includes a surface altering tool, and preferably includes a motorized transport vehicle. The device may be transported from Earth using known techniques.

The method further includes receiving a request to create a design on the surface of an extraterrestrial body, such as the Earth's moon, as shown at step 304. This step is preferably performed on Earth, and in a preferred embodiment involves receipt of appropriate data signals at a server or other computerized system via a communications network such as the interne. The request, and the design, may have any suitable form. By way of example, the request may be to create a textual design, such as a name or phrase. A more elaborate request might require the individual to provide data—e.g., the result of a three dimensional scan—that would permit the surface altering tool to recreate a three-dimensional image, such as a face, foot print, etc. By way of example, such data may be provided by transmitting a suitable data file via the communications network.

Next, the method involves transmitting to the device 150 a control signal that will cause the device to create the design, as shown at step 306. Preferably, the control signal is created by the service provider's 106 system 108, and then transmitted to the device 150 via the communication station 120. By way of example, the control signal may provide instructions for controlling the surface altering tool and/or the transport vehicle 190.

The receipt of the control signal at the device 150 causes the control module 200 to control the surface altering tool 160a, 160b to create the requested design on the surface of the extraterrestrial body, e.g., by causing the vehicle 190 to traverse the surface, by operating the articulatable arm, or by configuring tread of a configurable-tread rover wheel and causing the vehicle to traverse the surface to impart impressions corresponding to the tread configuration.

The method further involves determining whether a request for merchandise has been received, as shown at step 308. For example, this request for merchandise may have been part of or associated with the request received in step 304. If not, then in this exemplary embodiment, the method ends, as shown at steps 308 and 316.

If it is determined in step 308 that a merchandise request has been received, then the system receives from the device an image signal showing an image of the design created on the surface of the body, as shown at step 310. In other embodiment other types of information may be received additionally, or alternatively.

This signal is transmitted from the device 150, and is received on Earth via the communication station 120, and ultimately by the service provider's system 108. The method then involves creating of the requested merchandise bearing the image, and sending the merchandise to a recipient, as shown at steps 312 and 314. The recipient may or may not be the same as the requesting entity. Further, the merchandise may be manufactured by the service provider, or the service provider may outsource such manufacture to an independent party. It should be noted that the merchandise may be an intangible object, such as an electronic data file, such as an *.jpg electronic image file, and that such an object may be sent to the recipient by electronically transmitting the file via a communications network. Alternatively, the merchandise may be a tangible (physical) object, such as a coffee mug bearing an image of the design as it exists on the surface of the extraterrestrial body, and that such an object may be sent to the recipient by transport vehicle (vehicle 11, FIG. 1) or other means. By way of further example, the requested merchandise may be a three-dimensional reproduction of the design as it exists on the surface of the extraterrestrial body.

Thus, the present invention provides a method for satisfying demand for unique gifts, memorials, trophies, awards, prizes, commemorations, and such, by creating, potentially very long-lived designs, e.g. including messages, on the surface of an extraterrestrial body using a device deployable on the surface of an extraterrestrial body outfitted with one or more means for altering the surface of the extraterrestrial body, such as wheels with on-the-fly reconfigurable tread heads, so as to implement a desired design on the surface in accordance with an entity's instructions. The device is outfitted with cameras and other sensors to collect data about the created design and a communication system to transmit the data back to Earth. The transmitted data, along with any additional data supplied by the ordering entity, is used to produce merchandise incorporating recordings of the collected data, hard copy images, or combinations of images and text, and reproductions of the implemented design to be delivered per the entity's instructions.

While there have been described herein the principles of the invention, it is to be understood by those skilled in the art that this description is made only by way of example and not as a limitation to the scope of the invention. Accordingly, it is intended by the appended claims, to cover all modification of the invention which fall within the true spirit and scope of the invention.

What is claimed is:

1. A configurable-tread wheel, the configurable-tread wheel comprising:
   a wheel hub defining a plurality of radially-extending channels;
   a plurality of tread elements, each tread element being supported in a respective one of said plurality of radially-extending channels, each tread element comprising:
   a tread head supported on an elongated post;
   a rotating cup having a central opening for receiving said post, a radially-extending flange and a plurality of longitudinally-extending ridges spaced about its periphery, said rotating cup terminating in a pin;
   a spring supported about said post and abutting said flange to bias said tread head toward a retracted position;
   an elongated push pin having a central opening for receiving said pin of said rotating cup; and
   a grooved insert having an internal channel admitting passage of said elongated push pin and a plurality of longitudinally-extending grooves spaced about its channel, the grooved insert further comprising a plurality of angled surfaces configured to guide the ridges of the rotating cup and cause incremental rotation of the rotating cup about an axis in response to reciprocation of the rotating cup within the grooved insert along the axis; and
   a plurality of solenoids supported within said wheel hub, each of said plurality of solenoids being operatively connected to a control module to permit actuation of each said solenoid upon receipt of a control signal from said control module.

2. The configurable-tread wheel of claim 1, further comprising:
said control module.

3. A configurable-tread wheel, the configurable-tread wheel comprising:
   a wheel hub defining a plurality of radially-extending channels;
   a plurality of tread elements, each tread element being supported in a respective one of said plurality of radially-extending channels, each tread element comprising:
     a tread head supported on an elongated post;
     a rotating cup having a central opening for receiving said post, a radially-extending flange and a plurality of longitudinally-extending ridges spaced about its periphery, said rotating cup terminating in a pin;
     a spring supported about said post and abutting said flange to bias said tread head toward a retracted position;
     an elongated push pin having a central opening for receiving said pin of said rotating cup; and
     a grooved insert having an internal channel admitting passage of said elongated push pin and a plurality of longitudinally-extending grooves spaced about its channel, the grooved insert further comprising a plurality of angled surfaces configured to guide the ridges of the rotating cup and cause incremental rotation of the rotating cup about an axis in response to reciprocation of the rotating cup within the grooved insert along the axis; and
   a plurality of solenoids supported within said wheel hub, each of said plurality of solenoids being operable to actuate upon receipt of a control signal from a control module.

4. The configurable-tread when of claim 3, further comprising:
   said control module, said control module being operatively connected to said plurality of solenoids, said control module being configured to provide control signals for selectively causing actuation of each of said plurality of solenoids.

5. A configurable-tread wheel, the configurable-tread wheel comprising:
   a wheel hub defining a plurality of radially-extending channels;
   a plurality of tread elements, each tread element being supported in a respective one of said plurality of radially-extending channels, each tread element comprising a tread head supported on an elongated post; and
   a plurality of solenoids supported within said wheel hub, each of said plurality of solenoids being operable to move a respective one of said plurality of tread elements within a respective one of said plurality of radially-extending channels to selectively extend or retract a respective tread head.

6. The configurable-tread when of claim 5, further comprising:
   a control module, said control module being operatively connected to said plurality of solenoids, said control module being operable to provide control signals for selectively causing actuation of each of said plurality of solenoids to selectively extend or retract a respective tread head.

* * * * *